United States Patent [19]

Fukumoto et al.

[11] Patent Number: 4,580,620
[45] Date of Patent: Apr. 8, 1986

[54] CONTROLLING THE AIRFLOW RATE IN AN AIR CONDITIONER

[75] Inventors: Ryutaro Fukumoto; Yukio Yoshida; Ryosaku Akimoto, all of Nagoya, Japan

[73] Assignee: Mitsubishi Jukogyo Kabushiki Kaisha, Tokyo, Japan

[21] Appl. No.: 728,162

[22] Filed: Apr. 30, 1985

Related U.S. Application Data

[63] Continuation of Ser. No. 418,384, Sep. 15, 1982, abandoned.

[30] Foreign Application Priority Data

Oct. 30, 1981 [JP] Japan ................. 56-174202

[51] Int. Cl.⁴ ............................. F28F 27/00
[52] U.S. Cl. ..................... 165/12; 165/16; 165/40; 165/42; 236/49
[58] Field of Search ............ 165/12, 16, 23, 26, 165/39, 40, 42; 236/49

[56] References Cited

U.S. PATENT DOCUMENTS 3,343,791  9/1967  White, Jr. ................... 236/1
3,402,654  9/1968  Berst .......................... 98/33
3,934,642  1/1976  Coulson et al. ............. 165/42
4,244,517  1/1981  Stanke et al. .............. 236/49
4,324,286  4/1982  Brett ........................ 165/23 X
4,325,426  4/1982  Otsuka et al. ............. 165/26 X
4,337,821  7/1982  Saito ........................ 165/12
4,358,050 11/1982  Naganomal et al. ........ 165/42
4,365,663 12/1982  Inoue et al. ............... 165/12
4,379,484  4/1983  Lom et al. ................ 165/16
4,408,713 10/1983  Iijima et al. .............. 236/49

FOREIGN PATENT DOCUMENTS 3144276   9/1982  Fed. Rep. of Germany .
2100476A 12/1982  United Kingdom ......... 236/49

Primary Examiner—Albert W. Davis, Jr.
Assistant Examiner—Randolph A. Smith
Attorney, Agent, or Firm—Wenderoth, Lind & Ponack

[57] ABSTRACT

In an air conditioner, the control of the airflow rate is effected by utilizing both the temperature deviation between the room temperature and a set temperature and an air-mix damper position as a proportional control factor with the airflow rate compensation being based on an incremental integer control factor which has been derived from the temperature deviation.

1 Claim, 7 Drawing Figures

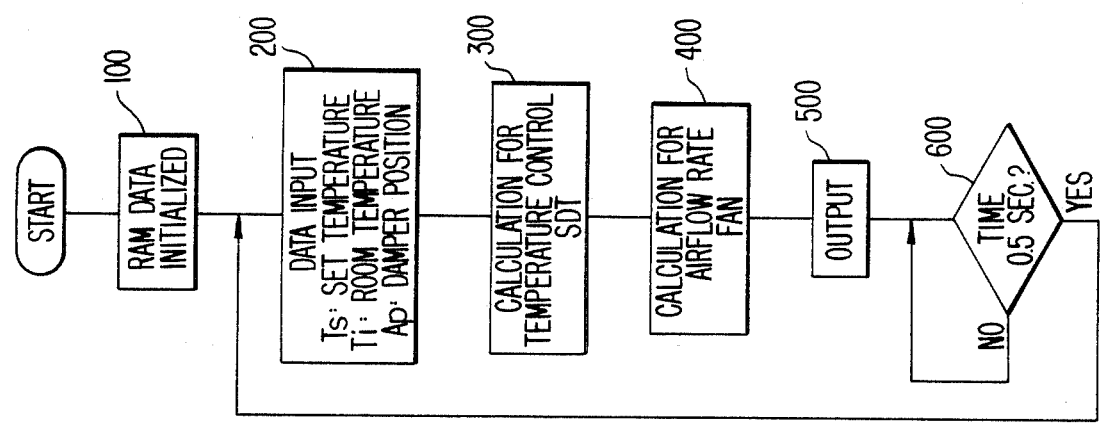
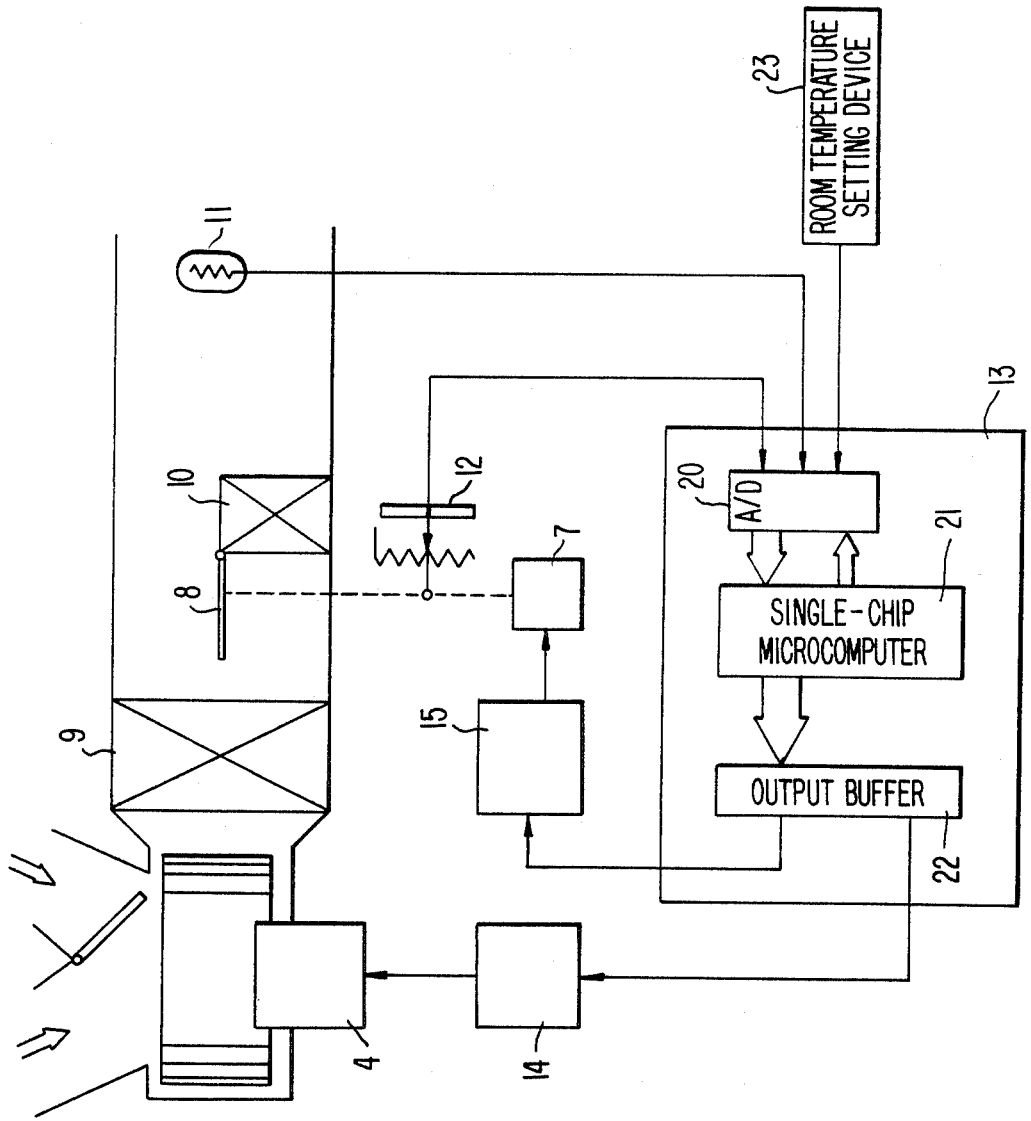

CONTROLLING THE AIRFLOW RATE IN AN AIR CONDITIONER

This application is a continuation of now abandoned application Ser. No. 418,384, filed Sept. 15, 1982.

BACKGROUND OF THE INVENTION

The present invention relates to a method and an apparatus for controlling the airflow rate in an air conditioner.

As an airflow rate control apparatus in an air conditioner, for example, an automatic airflow rate control apparatus in an air conditioner for use in vehicles is constructed as shown in FIG. 1. More particularly, with reference to FIG. 1, reference numeral 1 designates a power supply, numeral 2 designates a fuse, numeral 3 designates a fan switch, numeral 4 designates a fan, numeral 5 designates a resistor for regulating the airflow rate, numeral 6 designates a fan transfer switch, numeral 7 designates an actuator for driving an air-mix damper, numeral 8 designates an air-mix damper, numeral 9 designates a cooler and numeral 10 designates a heater. In this control apparatus, the flow rate of the air flow supplied from the fan 4 is adapted to be varied in a step-wise manner according to the opening angle of the air-mix damper 8. In some modified control apparatus, in place of the aforementioned fan transfer switch 6, there is provided a potentiometer and, by means of this potentiometer, an air-flow rate is controlled in a stepless manner, for example, as shown in FIG. 2.

In either of these known control apparatus, the airflow rate is preset depending upon an air-mix damper position. Therefore, even under the condition, for example, that the desired temperature regulation can be effected with an air-mix damper placed at the MAX COOL position and the fan operated at an L (low)-level, since such an operating condition is not preset, the air-mix damper opens somewhat to the heater side so as to slightly raise the temperature of the blown out air to compensate for this, the airflow rate of the fan is increased, so that the same cooling capability as that obtained under the condition of the MAX COOL position of the air-mix damper and the L-level operation of the fan may be eventually realized. In other words, operation is effected while wastefully reheating cooled air and increasing the airflow rate of a fan, and therefore, the operation is not only inefficient but is also associated with an energy loss.

Furthermore, FIG. 3 shows the relationship between the temperature deviation and airflow rate in another known control apparatus in which the airflow rate is controlled by the temperature deviation between the room temperature and a preset temperature. However, in this case, when the temperature deviation becomes small, the airflow rate of a fan is decreased and hence the cooling capability or the heating capability is also lowered. Therefore, this type of apparatus has a disadvantage in that even if the air-mix damper is placed at the MAX COOL position or the MAX HOT position, a temperature deviation would still remain. More particularly, for example, even under the condition that a set temperature can be realized when the air-mix damper is placed at the MAX COOL position and the airflow rate is held at the maximum, as the room temperature approaches the set temperature, the airflow rate would be decreased and hence the cooling capability would become insufficient. This means that it is impossible to reach the set temperature and thus this apparatus is very unsuitable.

SUMMARY OF THE INVENTION

It is therefore one object of the present invention to provide a method for controlling the airflow rate in an air conditioner, which makes it possible to obtain an appropriate airflow rate balanced with the load of the air conditioner while maintaining a temperature deviation at a minimum and to realize high-precision controlled air conditioning.

Another object of the present invention is to provide a control apparatus for the airflow rate in an air conditioner, which is favorable for practicing the above-mentioned control method.

According to one feature of the present invention, there is provided a method for controlling the airflow rate in an air conditioner, in which the control of the airflow rate is effected by utilizing either the temperature deviation between the room temperature and a set temperature or utilizing an air-mix damper position as a proportional control factor with airflow rate compensation based on a control factor which is derived from said temperature deviation.

According to another feature of the present invention, there is provided an airflow rate control apparatus in an air-mix type air conditioner including a fan, a cooler for cooling air blown from said fan, a heater for heating a cold airflow cooled by said cooler and an air-mix damper for controlling the flow rate of an airflow supplied to said heater, wherein the control apparatus comprises a room temperature detecting sensor, a room temperature setting device, and an arithmetic unit for airflow rate control receiving temperature signals from said room temperature detecting sensor and said room temperature setting device, respectively, and a position signal from said air-mix damper supplied to its input for carrying out an airflow rate control calculation utilizing either the temperature deviation between the room temperature and a set temperature or utilizing an air-mix damper position as a proportional control factor with airflow rate compensation based on a control factor derived from said temperature deviation, and outputting a control output signal for said fan.

BRIEF DESCRIPTION OF DRAWINGS

The above-mentioned and other features and objects of the present invention will become more apparent by reference to the following detailed description of a preferred embodiment of the invention taken in conjunction with the accompanying drawings, wherein:

FIG. 4 is a schematic view showing one preferred embodiment of the present invention as applied to an airflow rate control apparatus in an air conditioner for use in vehicles.

FIGS. 5 and 6 are flow charts of a program to be used for explaining the operation of the apparatus shown in FIG. 4.

DESCRIPTION OF THE PREFERRED EMBODIMENTS

Figure 6:
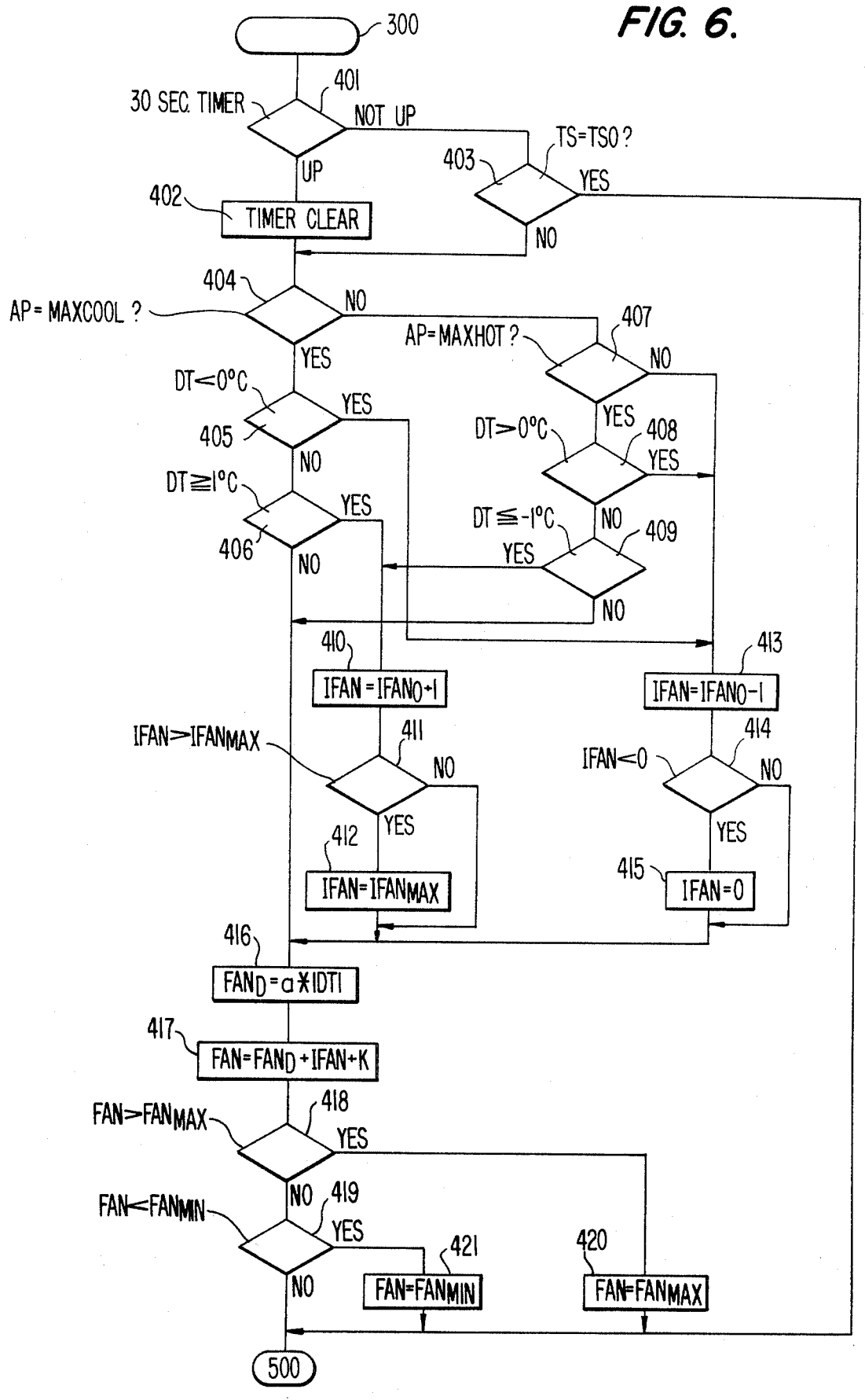
Figure 7:
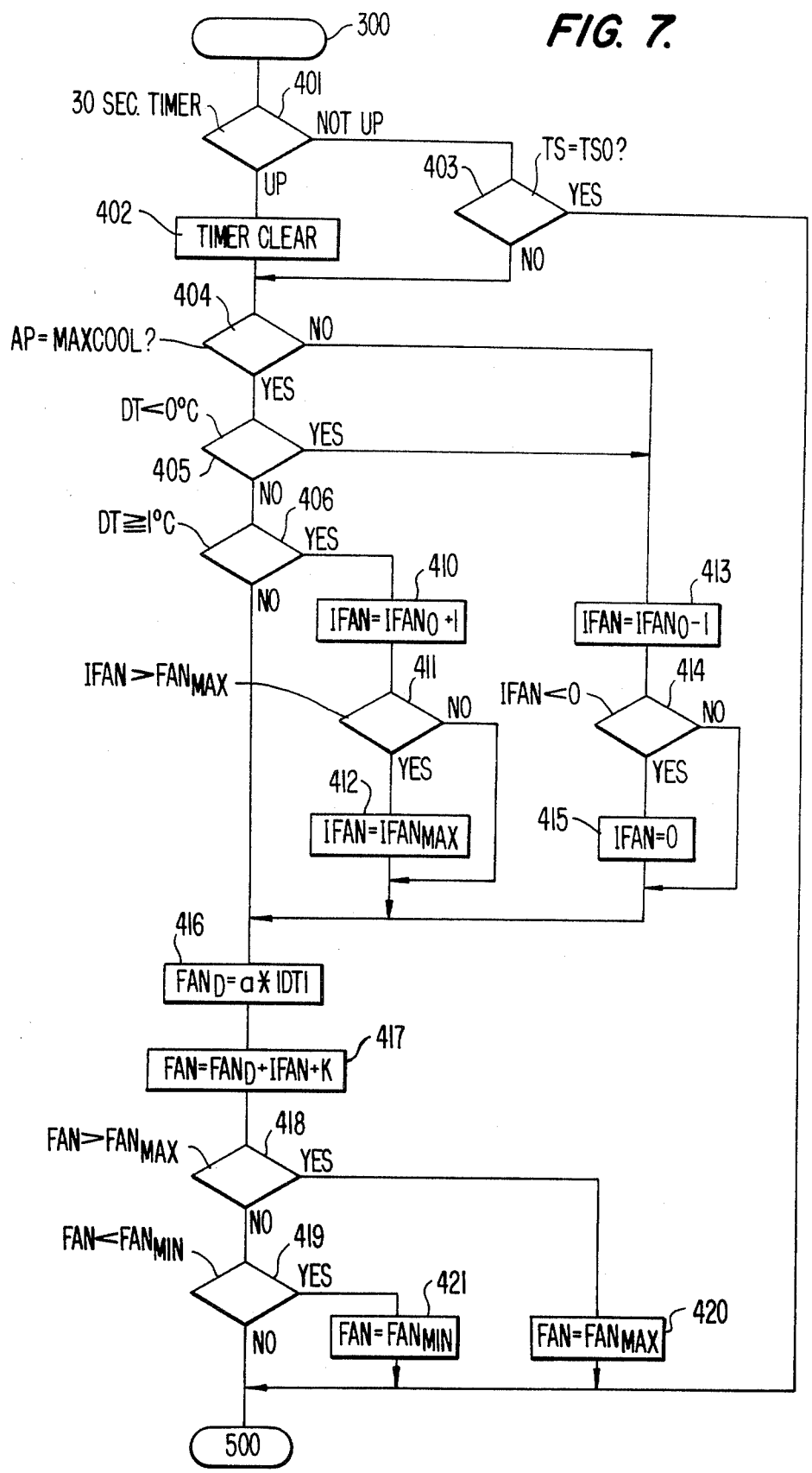
FIG. 7 is a flow chart of a program in the case where the program shown in FIG. 6 is limited only to the cooling side.

According to one preferred embodiment, the method for controlling an airflow rate according to the present invention can be practiced by means of a control apparatus illustrated in FIG. 4 and on the basis of the respective software shown in FIGS. 5, 6 and 7.

Figure 1:
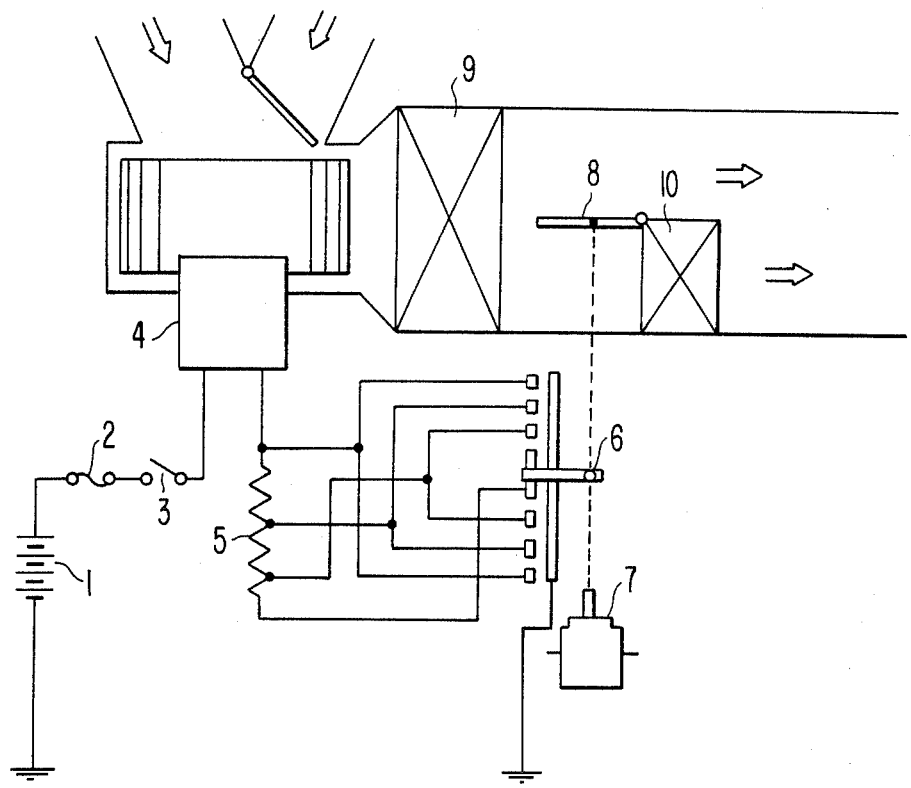
FIG. 1 is a schematic view showing an airflow rate control apparatus in an air conditioner for use in vehicles in the prior art.
Figure 2:
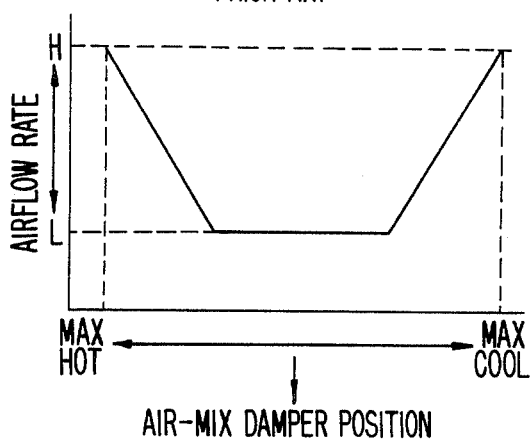
FIG. 2 is a diagram showing the relationship between an air-mix damper position and the airflow rate in the a airflow rate control apparatus in the prior art.
Figure 3:
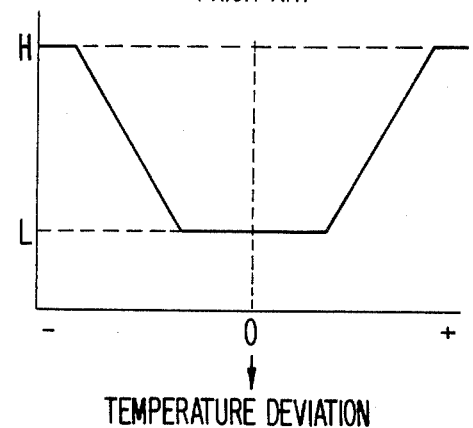
FIG. 3 is a diagram showing the relationship between a temperature deviation and the airflow rate in the airflow rate control apparatus in the prior art.

In FIG. 4, component parts identical to those shown in FIG. 1 are denoted by like reference numerals. In this figure, reference numeral 4 designates a fan, numeral 7 designates an actuator for driving an air-mix damper 8, numeral 9 designates a cooler and numeral 10 designates a heater. Reference numeral 11 designates a sensor for detecting the room temperature and numeral 12 designates a potentiometer for detecting the opening angle of the air-mix damper 8. Reference numeral 13 designates a control unit principally consisting of an A/D converter 20, a single-chip microcomputer 21, an output buffer 22 and the like. Reference numeral 14 designates a driving device for the fan 4 and numeral 15 designates a driving device for the actuator 7 which drives the air-mix damper 8. The information obtained via the room temperture sensor 11, potentiometer 12 and room temperature setter 23 is taken in the control unit 13 via the A/D converter 20 and subjected to various operations in the single-chip microcomputer 21, and the control output signals to be applied to the respective driving devices are amplified by an output buffer and are output therefrom.

Now, the operation of the airflow rate control apparatus according to the present invention will be explained in connection with the program of the software as shown in FIGS. 5, 6, and 7. These programs are set in an ROM region in the single-chip microcomputer 21.

At first, with reference to FIG. 5, in response to switching on of a power supply, a program in the single-chip microcomputer 21 in FIG. 4 starts, and at step 100, a timer within the single-chip microcomputer 21 is started and a data memory in a RAM region is initialized. Next, at step 200, analog inputs such as a set temperature TS, a room temperature Ti, a damper position AP, etc. are applied via the A/D converter 20 to the single-chip microcomputer 21, and at step 300, an arithmetic operation for room temperature control is carried out to calculate an output value SDT for an air-mixer damper driving device 15. Then at step 400, an arithmetic operation for airflow rate control according to the method for controlling an airflow rate of the present invention is carried out to calculate an airflow rate calculated value FAN, and at step 500, these calculated values are output from output terminals of the single-chip microcomputer 21. Furthermore, at step 600, a timing operation is carried out so as to ensure that the entire program is finished in a 0.5 sec. cycle.

Now one example of the step 400 in FIG. 5 will be described in more detail with reference to FIG. 6.

Sub-step 401 represents a timer for calculation of an airflow rate, in which, after a lapse of 30 seconds, a timer UP signal is issued. Although a timer of about 30 seconds is appropriate, the time could be either increased or decreased according to system requirements. When the timer has timed up, the program advances to sub-step 402, and after the timer has been cleared, the program advances to sub-step 404. Upon the first start up when the power supply is switched on, the timer of the sub-step 401 is held at a time UP state, and therefore, in the first cycle, the calculation for airflow rate control is always carried out. At sub-step 401, if the timer is in a NOT UP state, then the program advances to sub-step 403, wherein it is determined whether or not a set temperature TS has been varied. In the event that a set temperature in the current cycle TS coincides with a set temperature in the preceding cycle TSO, the program advances to the next step 500 without carrying out the calculation for an airflow rate, and so, the airflow rate would not be varied. In the event that the set temperatures TS and TSO do not coincide, the program advances to sub-step 404 and the subsequent sub-steps to carry out the calculation for the airflow rate control. Accordingly, unless the set temperature is not varied as in a normal case, the airflow rate is caculated and varied at least every 30 seconds.

At sub-step 404, it is determined whether or not the air-mix camper position AP is at MAX COOL, and if it is at MAX COOL, then the program advances to sub-step 405 wherein it is determined whether or not the temperature deviation DT is negative. The temperature deviation DT was calculated in step 300 according to the formula: $DT = T_i - TS$, where $T_i$ represents the room temperature and TS represents a set temperature. If $DT < 0°$ C., then the program advances to airflow rate decreasing sub-steps 413~415, whereas if $DT \geq 0°$ C., then the program advances to sub-step 406. At sub-step 406, if $DT \geq 1°$ C., then the program advances to airflow rate increasing sub-steps 410~412, whereas if $DT < 1°$ C. then the program advances to sub-step 416.

Or else, at sub-step 404, if it is determined that the air-mix damper position AP is not at MAX COOL, then at sub-step 407 it is determined whether or not the air-mix damper position AP is MAX HOT, and if it is not at MAX HOT, the program advances to airflow rate decreasing sub-steps 413~415 because the air-mix damper position AP must be in the intermediate region between MAX HOT and MAX COOL at that time. In the event that the air-mix damper position AP is at MAX HOT, then if the temperature deviation DT is determined at sub-step 408 to be $DT > 0°$ C., the program advances to the airflow rate decreasing sub-steps 413~415, whereas if it is determined to be $DT \leq 0°$ C., the program advances to sub-step 409, and at sub-step 409, if $DT \leq -1°$ C., the program advances to the airflow rate increasing sub-steps 410~412, while if $DT > -1°$ C., the program advances to sub-step 416. In the airflow rate increasing sub-steps 410~412, at sub-step 410, an airflow rate integer incremental value IFAN is increased by one from its previous value IFAN$_o$, and at sub-step 411 it is determined whether or not the airflow rate integer incremental value IFAN is greater than an airflow rate integer incremental limit value IFAN$_{max}$, and if it is not greater than the limit value IFAN$_{max}$, it is not varied, while if it is greater than the limit value IFAN$_{max}$, at sub-step 412 the airflow rate integer incremental value IFAN is changed so that IFAN = IFAN$_{max}$. In the airflow rate decreasing sub-steps 413~415, at sub-step 413 the airflow rate integer incremental value IFAN is decreased by one from its previous value IFAN$_o$, and at sub-step 414 it is determined whether or not the airflow rate and integer incremental value IFAN is smaller than 0, and if it is not smaller than 0, it is not varied, while if it is smaller than 0, at sub-step 415 it is changed so that IFAN = 0. (It is to be noted that upon start up, IFAN is set at 0.) Subsequently, at sub-step 416, an airflow rate calculated value $FAN_D$ that is proportional to the absolute value of the temperature deviation 1DT1 is calculated, and further, at sub-step 417 the airflow rate calculated value $FAN_D$ is added to the airflow rate integer incremental value IFAN and an airflow rate coefficient K to derive the airflow rate calculated value FAN. That is, the calculated new airflow rate is incrementally increased or decreased in accordance with the airflow rate value.

At sub-steps 418~420, if the airflow rate calculated value FAN is larger than an airflow rate upper limit value $FAN_{max}$, then it is changed so that $FAN=FAN_{max}$, whereas if it is smaller than an airflow rate lower limit value $FAN_{min}$, then it is changed so that $FAN=-FAN_{min}$, and thus the calculation for the airflow rate calculated value FAN has been finished. Then the program advances to step 500.

As a result of the above-mentioned program, in the case where the air-mix damper position AP is at MAX COOL, in response to a temperature deviation of $DT \geq 1°$ C. the airflow rate integer incremental value IFAN is increased, whereas in the case where the air-mix damper position AP is at MAX HOT, in response to a temperature deviation of $DT \leq -1°$ C. the airflow rate integer incremental value IFAN is increased. In the case where the air-mix damper position AP is at MAX COOL and $DT<0°$ C. or the air-mix damper position AP is at MAX HOT and $DT>0°$ C., or the air-mix damper position AP is in the intermediate region between MAX COOL and MAX HOT, then the airflow rate integer incremental value IFAN is decreased. In addition, in the case where the air-mix damper position AP is at MAX COOL and $0°$ C.$\leq DT<1°$ C., or the air-mix damper position AP is at MAX HOT and $-1°$ C.$<DT>0°$ C., then the airflow rate integer incremental value IFAN is not varied.

FIG. 7 shows a modified embodiment of the present invention, in which the calculating operation for the airflow rate is carried out only on the cooling side. The construction and operation of this modified embodiment differs from the first embodiment in FIG. 7 only in that the sub-steps 407~409 are omitted. Therefore, further description of this modified embodiment will be omitted here.

Since the present invention has the above-mentioned feature, e.g.—even in the event that the air-mix damper position AP is at MAX COOL, if the temperature deviation is larger than 1° C., then the airflow rate is increased, and therefore, the temperature deviation is normally maintained smaller than 1° C. In addition, if the temperature deviation comes in the range of 0°~1° C., then the airflow rate becomes constant, and if the temperature is further lowered and the temperature deviation becomes smaller than 0° C., then the airflow rate is decreased. Likewise, even in the event that the air-mix damper position AP is at MAX HOT, if the temperature deviation is a larger negative value than $-1°$ C., then the airflow rate is increased, hence the temperature deviation is decreased, and if the temperature deviation comes in the range of $-1°\sim0°$ C., then the airflow rate becomes constant. In addition, if the temperature rises further and the temperature deviation becomes larger than 0° C., then the airflow rate is decreased. Then, an optimum airflow rate can be obtained, at which rate the heating capability is lowered, hence the temperature is lowered and the temperature deviation can be maintained within $0°\sim-1°$ C.

When the air-mix damper position is in the intermediate region (between MAX COOL and MAX HOT), the airflow rate integrated value IFAN is always subjected to subtraction, hence normally IFAN=0 is realized, and thus it varies in proportion to only the temperature deviation. However, if a temperature deviation still remains, the air-mix damper would be displaced in the step of temperature control, and the airflow rate regulated so as to realize a temperature deviation equal to 0 would become the minimum necessary air flow rate. As a result, an optimum airflow rate balanced to the air conditioner load can be obtained while maintaining the temperature deviation at the minimum, and moreover, air conditioning at an extremely high precision becomes possible. Furthermore, since the calculation for the airflow rate is carried out basically, for example, every 30 seconds, the variation of the airflow rate is moderate, but nevertheless in the event that the set temperature has been varied, the calculation for the airflow rate is quickly carried out, and so, a sufficiently high speed response for airflow rate control can be realized.

In the above-described preferred embodiments of the present invention, as a matter of course, the temperature criterion in the sub-steps 405, 406, 408 and 409 could be changed, if necessary, and with regard to the addition and subtraction for the airflow rate integer incremental value, the value "1" in the sub-steps 410 and 413 could be changed to an appropriate value, and further, in place of the value "1", a function of the temperature deviation DT could be employed. Still further, it is a matter of course that the calculation for the airflow rate the sub-step 416 could be a calculation of an airflow rate based on the air-mix damper position AP or the same calculation taking the temperature deviation also into account.

In the above description of the preferred embodiments, the present invention has been described as applied to an air conditioner for use in vehicles. However, the present invention should not be limited only to the above-described embodiments, but it could be equally applied to other types of air conditioners such as, for example, an air conditioner for use in houses.

In summary, the present invention provides a method for controlling an airflow rate in an air conditioner characterized in that control for an airflow rate is effected by utilizing either the temperature deviation between a room temperature and a set temperature or utilizing an air-mix damper position as a proportional control factor with airflow rate compensation based on a control factor derived from said temperature deviation; and an airflow rate control apparatus in an air-mix type air conditioner including a fan, a cooler for cooling air blown from said fan, a heater for heating a cold airflow cooled by said cooler and an air-mix damper for controlling the flow rate of an airflow supplied to said heater, characterized in that said control apparatus comprises a room temperature detecting sensor, a room temperature setting device and and an arithmetic unit for airflow rate control having temperature signals from said room temperature detecting sensor and said room temperature setting device, respectively, and a position signal of said air-mix damper applied to its inputs for carrying out calculation for airflow rate control by utilizing either a temperature deviation between the room temperature and a set temperature or utilizing an air-mix damper position as a proportional control factor with airflow rate compensation based on a control factor derived from said temperature deviation, and outputting a control output signal for said fan; whereby an optimum airflow rate balanced to an air conditioner load can be obtained while maintaining a temperature deviation at the minimum and thus air conditioning at an extremely high precision can be realized. Therefore, the present invention is industrially very useful.

What is claimed is:

1. A method for controlling the airflow rate in an air-mix type air conditioner for use in vehicles comprising a fan, a cooler for cooling air blown out of said fan, a heater for heating at least a portion of a cold airflow cooled by said cooler and an air-mix damper for controlling the temperature of the blown-out air by regulating the proportion between a flow rate of the air passing through said heater and a flow rate of the air by-passing said heater and for effecting temperature control by automatically controlling the position of said air-mix damper by utilizing a room temperature, a set temperature and the position of the air-mix damper as inputs, wherein, based upon the position of the air-mix damper and the temperature difference DT between the room temperature and the set temperature:

when the air-mix damper is positioned at a MAX COOL position, if the temperature difference DT is positive, the airflow rate of the fan is gradually increased, whereas if the temperature difference DT is negative, the airflow rate of the fan is gradually decreased;

when the air-mix damper is positioned at a MAX HOT position, if the temperature different DT is negative, the airflow rate of the fan is gradually increased, whereas if the temperature difference DT is positive, the airflow rate of the fan is gradually decreased; and when the air-mix damper is positioned in an intermediate position which is between the MAX COOL and MAX HOT positions, regardless of the value of the temperature difference DT, the airflow rate of the fan is gradually decreased until a point at which the airflow rate of the fan is adjusted so as to be proportional to the absolute value of the temperature difference DT.

* * * * *